P. BARKER.
Thrashing Machine.
No. 88,690.   Patented April 6, 1869.
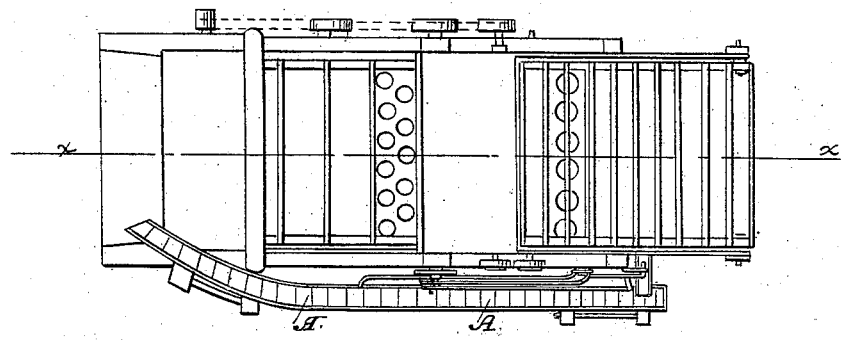
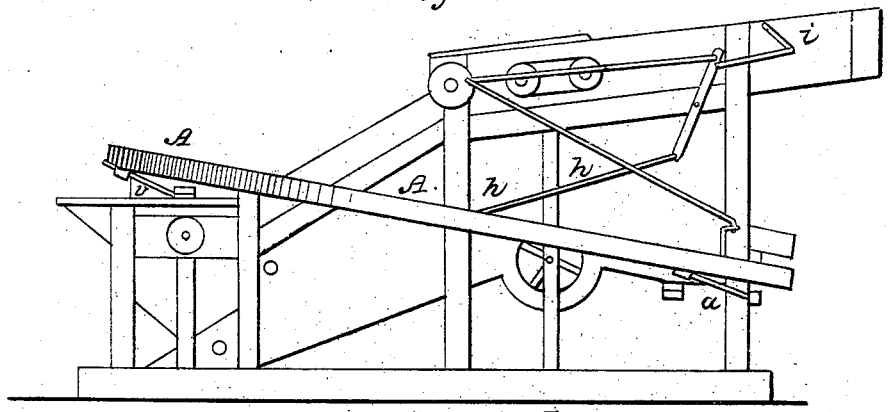
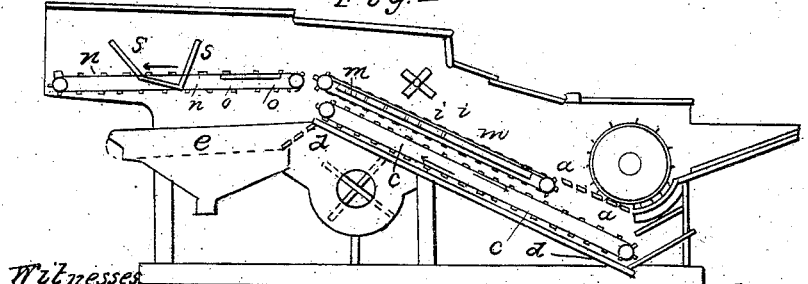
Witnesses
Inventor
Peleg Barker

United States Patent Office.

PELEG BARKER, OF BATTLE CREEK, MICHIGAN, ASSIGNOR TO HIMSELF AND THE JOLIET MANUFACTURING COMPANY, OF JOLIET, ILLINOIS.

Letters Patent No. 88,690, dated April 6, 1869.

IMPROVEMENT IN GRAIN-SEPARATOR.

The Schedule referred to in these Letters Patent and making part of the same.

Be it known that I, PELEG BARKER, of the city of Battle Creek, in Calhoun county, State of Michigan, have invented new and useful Improvements in Machines for Threshing, Separating, and Cleaning Grain; and I do hereby declare the following to be a full, clear, and exact description of the construction and operation of the same, reference being had to the accompanying drawings, making a part thereof, in which—

Figure 1 represents a longitudinal section:
Figure 2 represents a top plan; and
Figure 3 represents a side elevation.

The nature of my invention relates to the manner in which I have constructed and arranged the raddles or slatted carrying-aprons in connection with the "inclined trunk," so as to separate and carry off the straw without carrying off or out of the machine the grain with said straw, using one of said raddles to convey the grain to the cleaner; an elevator for returning the unthreshed heads of grain, &c., back again to the threshing cylinder, grates, or perforated floors, to prevent the fine straw from filling up and choking or stopping the raddles, and the agitator $r$, placed in the raddle $n$, to cause a perfect separation of the threshed grain from the straw.

I construct my machine similar to the Pitts machine, except in place of an apron, or grain-belt for conveying the grain and chaff, I use a secondary raddle, or slotted belt $c$, with a tight floor $d$ below, which said raddle runs in an opposite direction from the others. This raddle exclusively elevates the grain and chaff to the cleaner, as is shown in my drawings, and is not used or intended to carry straw.

I place directly above said raddle, or slotted belt $i$, another open raddle, or slotted belt, which carries the straw from the grate back of the threshing-cylinder, and delivers the same on raddle $n$, which carries it clear from the machine. These raddles $i$, and $n$, are each provided with a perforated floor, to prevent the fine straw from filling up and choking or stopping the raddles.

I use the agitator $r$ to shake the raddle in such a manner that any threshed or shelled grain that might be in the straw would be shaken out. This agitator swings forward and backward on the rods $s\ s$, by means of the crank $t$, fig. 3. It will be readily observed that as it swings it strikes the raddle, as is shown in fig. 1, which causes a violent agitation of the same, keeping the straw tossing up and down as it passes along.

I use an elevator A for returning unthreshed heads of grain, &c., to the cylinder to be run through again. The floor of the elevator is notched, and has sides to hold the grain in, and is made to slide forward and backward on the ways $v$, by means of the shaft $h$. These ways $v$ are placed in such an angle that as the elevator moves forward and backward it has a tossing motion, which throws the grain along from notch to notch until it is discharged into the thresher.

The operation of my machine is that the grain is fed to the thresher in the usual manner. The cylinder threshes the grain from the straw, which is carried away by means of raddles as described; the grain fall through the grates under the cylinder, thence is allowed to fall to the tight floor $d$, from which it is carried, by means of raddle $c$, to the cleaner, also any grain that may fall or be shaken from raddle $i$ falls through raddle $c$ to the floor, and is carried up to the cleaner.

The raddles, &c., are driven or rotated by means of suitable belts and pulleys or gearing, and the elevator A carries the unthreshed heads of grain, &c., back to the thresher as above described.

Having thus described my invention,

What I claim as new, and desire to secure by Letters Patent, is as follows, to wit:

1. The two open raddles $c$ and $i$ and the grain-floor or trunk, combined together, and arranged in relation to the thresher and cleaner, as set forth and shown.

2. Also, the elevator A, fig. 3, for the purpose of elevating unthreshed heads of grain, &c., back to the thresher, substantially as described.

3. Also, the agitator $r$, when constructed and operating as described, for the purposes set forth.

PELEG BARKER.

Witnesses:
THOS. H. HUTCHINS,
A. H. SHREFFLER.